(12) United States Patent
Albouyeh et al.

(10) Patent No.: US 9,693,181 B1
(45) Date of Patent: Jun. 27, 2017

(54) SURVEILLANCE DETECTION BASED ON AN IDENTIFICATION OF A CARRIED MOBILE DEVICE

(71) Applicant: International Business Machines Corporation, Armonk, NY (US)

(72) Inventors: Shadi E. Albouyeh, Raleigh, NC (US); Ramakrishna Boggarapu, Cary, NC (US); Trina M. Burkett, Morrisville, NC (US); Alexandru Pitigoi, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/271,362

(22) Filed: Sep. 21, 2016

(51) Int. Cl.
| | |
|---|---|
| *G08B 13/00* | (2006.01) |
| *H04W 4/00* | (2009.01) |
| *G08B 13/18* | (2006.01) |
| *H04L 29/12* | (2006.01) |
| *H04L 29/08* | (2006.01) |
| *H04N 7/18* | (2006.01) |
| *G06K 9/00* | (2006.01) |
| *H04N 5/33* | (2006.01) |
| *H04N 5/225* | (2006.01) |
| *H04W 84/12* | (2009.01) |

(52) U.S. Cl.
CPC ........ *H04W 4/008* (2013.01); *G06K 9/00288* (2013.01); *G06K 9/00771* (2013.01); *G08B 13/18* (2013.01); *H04L 61/6022* (2013.01); *H04L 67/10* (2013.01); *H04N 5/2256* (2013.01); *H04N 5/332* (2013.01); *H04N 7/183* (2013.01); *H04W 84/12* (2013.01)

(58) Field of Classification Search
CPC .................................. G08B 1/00; H04N 1/00
See application file for complete search history.

(56) References Cited

U.S. PATENT DOCUMENTS

| | | |
|---|---|---|
| 3,129,415 A | 4/1964 | McKnight |
| 4,897,630 A | 1/1990 | Nykerk |
| 5,117,217 A | 5/1992 | Nykerk |
| 5,315,285 A | 5/1994 | Nykerk |

(Continued)

OTHER PUBLICATIONS

P. Mell et al., "The NIST Definition of Cloud Computing", National Institute of Standards and Technology, Information Technology Laboratory, Sep. 2011, pp. 1-7.

*Primary Examiner* — Shirley Lu
(74) *Attorney, Agent, or Firm* — John R. Pivnichny; Law Office of Jim Boice (57) ABSTRACT

A surveillance detection apparatus for detecting an intruder to a restricted space includes a short range radio transceiver and a processor. The short range radio transceiver, which has a predefined limited range, causes the surveillance detection apparatus to send an intrusion signal to the processor in response to the short range radio transceiver receiving a short range radio signal from a communication device that is in the possession of an intruder, who is not pre-authorized by the processor to be within the predefined limited range of the short range radio transceiver, and thus the restricted space. In response to determining that the communication device is not pre-authorized to be within the predefined limited range of the short range radio transceiver, the processor generates an intruder alert.

20 Claims, 6 Drawing Sheets

(56) References Cited

U.S. PATENT DOCUMENTS

| | | |
|---|---|---|
| 5,334,969 A | 8/1994 | Abe et al. |
| 6,429,893 B1 | 8/2002 | Xin |
| 2006/0261931 A1 | 11/2006 | Cheng |
| 2009/0170558 A1* | 7/2009 | Kuo ...................... H04M 11/04 455/556.1 |
| 2010/0177193 A1 | 7/2010 | Flores |
| 2013/0322708 A1 | 12/2013 | Heringslack |
| 2014/0218517 A1* | 8/2014 | Kim ................... H04L 12/2818 348/143 |
| 2015/0062343 A1 | 3/2015 | Hwang et al. |
| 2016/0189510 A1* | 6/2016 | Hutz .................. G08B 21/0205 340/541 |

* cited by examiner

SURVEILLANCE DETECTION BASED ON AN IDENTIFICATION OF A CARRIED MOBILE DEVICE

BACKGROUND

The present invention relates to the field of security devices, and particularly to intruder security devices. Still more particularly, the present invention relates to a novel intruder security device that interacts with mobile communication devices.

SUMMARY

In one or more embodiments of the present invention, a surveillance detection apparatus includes a short range radio transceiver and a processor. The short range radio transceiver, which has a predefined limited range, causes the surveillance detection apparatus to send an intrusion signal to the processor in response to the short range radio transceiver receiving a short range radio signal from a communication device that is in the possession of an intruder, who is not pre-authorized by the processor to be within the predefined limited range of the short range radio transceiver. In response to determining that the communication device is not pre-authorized to be within the predefined limited range of the short range radio transceiver, the processor generates an intruder alert.

In one or more embodiments of the present invention, a method and/or computer program product detects an intruder in a restricted area. One or more processors receive an intrusion signal from a surveillance detection apparatus that includes a short range radio transceiver, where the surveillance detection apparatus sends the intrusion signal to the processor in response to the short range radio transceiver receiving a short range radio signal from a communication device that is within a predefined limited range of the short range radio transceiver, and where the short range radio signal identifies the communication device. The processor(s) determine whether the communication device is authorized to be within the predefined limited range of the short range radio transceiver. In response to determining that the communication device is not pre-authorized to be within the predefined limited range of the short range radio transceiver, the processor(s) generate an intruder alert.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
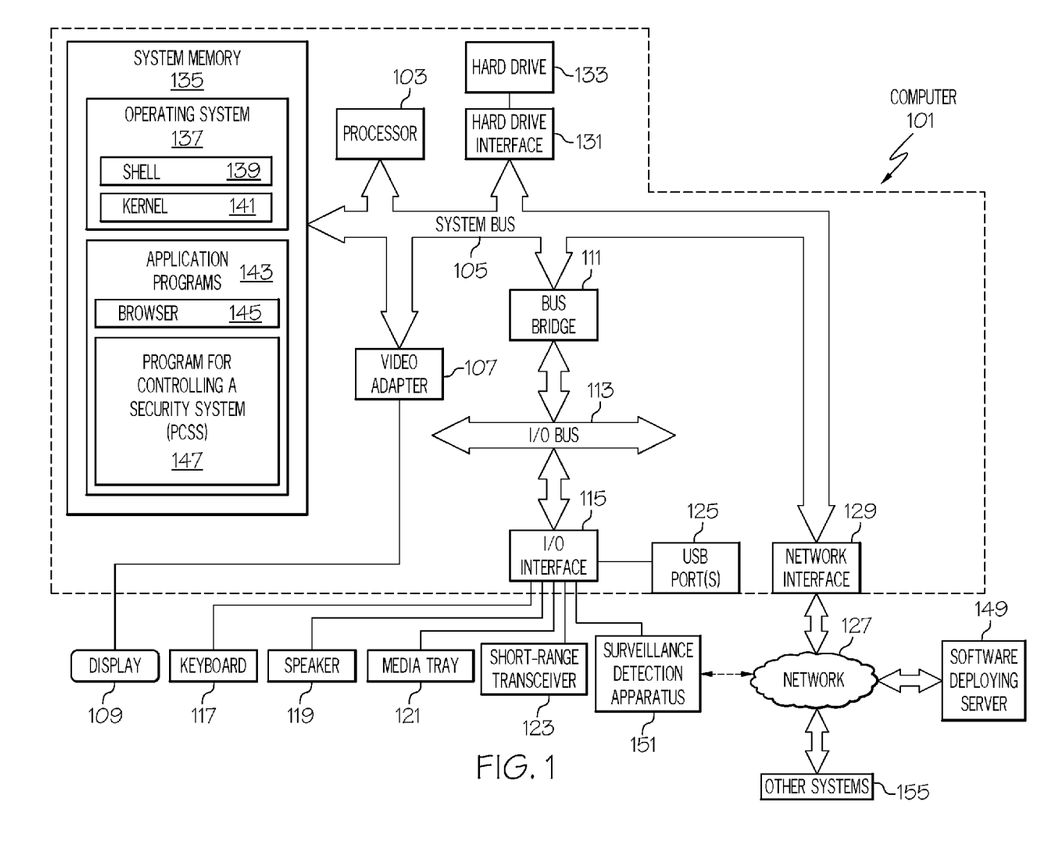
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or surveillance detection apparatus 151 and/or other systems 155 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), a short-range transceiver 123 (e.g., a transceiver for sending and receiving WiFi and/or other radio frequency signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Controlling a Security System (PCSS) 147. PCSS 147 includes code for implementing the processes described below, including those described in FIGS. 2-4. In one embodiment, computer 101 is able to download PCSS 147 from software deploying server 149, including in an on-demand basis, wherein the code in PCSS 147 is not downloaded until needed for execution. In one embodiment of the present invention, software deploying server 149 performs all of the functions associated with the present invention (including execution of PCSS 147), thus freeing computer 101 from having to use its own internal computing resources to execute PCSS 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Current surveillance technologies have limited visibility based on use of sensing devices including video cameras, motion detectors, glass breakers, etc., which all have limitations in coverage resulting in potential blind spots.

The present invention leverages short range field sensing technology (e.g., WiFi systems that comport with the IEEE 802.11x standards, limited range communications systems that comport with the IEEE 802.15.x standards for connecting devices that are within 10-100 meters of one another near field communications NFC systems, etc.). These short range field sensing technology solutions are leveraged in order to detect visitors in and around a restricted space (e.g., a home, store, school, secure facility, hazardous area, etc.) in order to help break the boundaries and limitations of current surveillance systems through the obtaining and processing of the universally unique identifier (UUID) of each mobile device associated with an individual in and around the premises to quickly identify people, potential risks of unwanted visitors and any other activity a user wishes to monitor around the premises.

That is, one or more embodiments of the present invention interrogate a mobile device being carried by a person who is within a restricted space, and thus is within range of a limited-range transceiver in (or associated with) a surveillance detection apparatus. This interrogation identifies the device, and thus the owner of the device. If the owner of the device is not authorized to be within the restricted space (i.e., the range of the limited range transceiver in the surveillance detection apparatus), then an alert is generated.

Thus, the present invention leverages mobile devices of individuals near or around a building (or other restricted space) in order to gauge visitor traffic in an effort to protect and survey visitors both unwanted and wanted. Specifically, our invention entails the use of WiFi (or other limited range system) access points, which are capable of providing data through radio signals in order to detect the presence and identity of mobile devices. With the assumption that most visitors/intruders will have a mobile device on their persons, and that such mobile devices are enabled with WiFi communication, the present invention engages with such devices to retrieve the unique identifier (MAC address of the mobile device) for interpretation in order to keep track of all those entering or around the premises/space under surveillance.

The present invention thus provides numerous advantages over the prior art, including better coverage (i.e., is not required to have a line of sight to the intruder, as required by visual surveillance systems), is not responsive to animal intrusions (due to the reliance upon the intruder carrying a cellular phone), etc.

A video surveillance system uses closed circuit television (CCTV) cameras that provide security feeds to video records. Thus, surroundings of a target area can be monitored for unexpected/unplanned visits of individuals visible for certain video cameras, which are usually mounted high on building walls, poles, or ceiling. The principle behind this monitoring system is the presence of light bouncing off any objects and hitting the highly sensible video sensor inside the video camera. In order to produce a quality video recording it is necessary to have a very good illumination in the area under video recording surveillance or a very low noise, high sensibility video camera sensor. During nighttime hours, video recording quality is improved by illuminating the area with infrared light (lower frequency electromagnetic waves, under the visible light spectrum), which is bounced off objects and captured by low-light (e.g., infrared) camera sensors. Some video surveillance devices embed the light source in the same encasing for optimal illumination of the surveyed area without "blinding" the video sensor, which is placed in the same plane as the light source.

The present invention provides an improvement over such video surveillance systems by utilizing electromagnetic waves in the communication spectrum, which are not required to follow a line of sight between the security device and the intruder. That is, while video cameras capture line-of-sight images of intruders, the present invention detects intruders that are not within the line-of-sight of the monitoring apparatus (e.g., surveillance detection apparatus 151 shown in FIG. 1), since electromagnetic waves in the communication spectrum are able to pass through walls and other obstructions. Exemplary electromagnetic waves in the communication spectrum are in the 2.4 or 5 GHz range, which are used by devices that comport with the IEEE 802.11x WiFi communication protocol. Thus, any WiFi access point (router, repeater or range extender) is capable of providing such electromagnetic waves. Based on the principles of the 802.11 protocol of exchanging "probe" data frames through the radio signal, any device such as a mobile phone can become "visible" to (i.e., detected by) the access point. The assumption is that there is a very high probability that individuals entering the area under surveillance may be carrying a mobile device, such as a cell phone, which is enabled for WiFi communication. Based on this assumption, the WiFi enabled mobile device engages automatically in a 802.11 communication protocol handshake which results in an exchange of globally unique identifiers (MAC addresses), which can be subsequently recorded (along with the timestamp and location), and act as a fingerprint of the individual mobile device detected.

To improve the WiFi access point ability to detect mobile devices, in one or more embodiments of the present invention the source of radio signal (e.g., the WiFi access point) is positioned in a location that allows unobstructed transmission/reception of radio signals to/from potential WiFi enabled devices. That is, the Wi-Fi access point is not concerned with structures such as walls and plants that allow the radio signals to pass there through, but is concerned with being blocked by radio frequency shields (e.g., grounded metal walls that act a Faraday cages).

Thus, in one or more embodiments, the present invention utilizes structures (e.g., poles, housings, etc.) that are in current use by a video surveillance system to hold the novel radio-based detection system presented herein. For example, a deployed LED-based light projector used in a video surveillance system also may provide the ideal housing for a 802.11 WiFi access point, including the necessary DC voltage power source. This allows the modified system to provide two types of electromagnetic waves for two different types of detection: video with its visibility limits (image resolution, blind spots, etc.), and the WiFi detection through 802.11 protocol data "probes", which has a much deeper penetration (up to several hundred meters), and is far less impacted by usual obstacles (with the exception of metallic structures and steel reinforced concrete).

The present invention thus interrogates the mobile phone with the Wi-Fi access point. If the mobile phone is registered with a person who is authorized to be within the monitored space (i.e., the space that is within range of the Wi-Fi access point), then no steps are taken. However, if the mobile phone is registered with a person who is not authorized to be within the monitored space, than an intrusion alert is generated. This intrusion alert may be a message (e.g., a text message) sent to a security service, an activation of a local alarm (e.g., flashing lights, klaxons, etc.), an entry into a security log, etc.

For instance, if a home owner identified certain individuals on a black list (persons who are prohibited from coming onto the property of the homeowner), then certain actions would be taken if those individuals were detected near the premise. Conversely, individuals with certain attributes (i.e., family member) would be classified as such and, if detected, allowed near the premise with no precaution needed.

In one or more embodiments, a set of WiFi access points (signal repeaters or range extenders) are deployed, capable of covering an expanded target surveillance area (extending to hundreds of meters, especially outdoors). The WiFi protocol 802.11 probe exchange of unique identifiers (MAC addresses) is then followed by the recording of data (WiFi device identifier and signal strength), which is sent for processing to a dedicated algorithm. The algorithm determines the proximity of the detected device to the target area and triggers the necessary handling of the event.

Thus, as presented herein, one or more embodiments of the present invention present a surveillance detection apparatus that includes: a radio antenna operable at microwave radio frequencies used by device communication protocols, where the antenna is attached to the enclosure and is coupled to a radio frequency modem, which is attached to a processor; an algorithm running on the processor for processing data from the antenna to identify an individual within a pre-specified distance from the surveillance detection apparatus; a digital camera in the enclosure, such that the camera is also in communication with a processor; and a visible light LED device and an infrared light LED device both mounted on the enclosure and separately controllable by the processor, in order to assist the digital camera in providing visual confirmation of the individual's presence and identity.

Thus, one or more embodiments of the present invention utilize a unique apparatus and algorithm to capture, process and analyze radio communication (e.g., WiFi handshake) data in order to identify an individual within a pre-specified distance from the apparatus, in order to prevent/restrict certain individuals from entering into/around the vicinity being monitored.

As described herein, one or more embodiments of the present invention augment a video day/night surveillance system with an apparatus and algorithm which allows an additional role identity assessment associated with a registered WiFi-enabled mobile device (carried by certain individuals) in and around the vicinity being monitored. At the same time, unknown/unregistered WiFi-enabled mobile devices detected in the monitored vicinity by unsuspecting and unexpected individuals can be identified as such.

Figure 2:
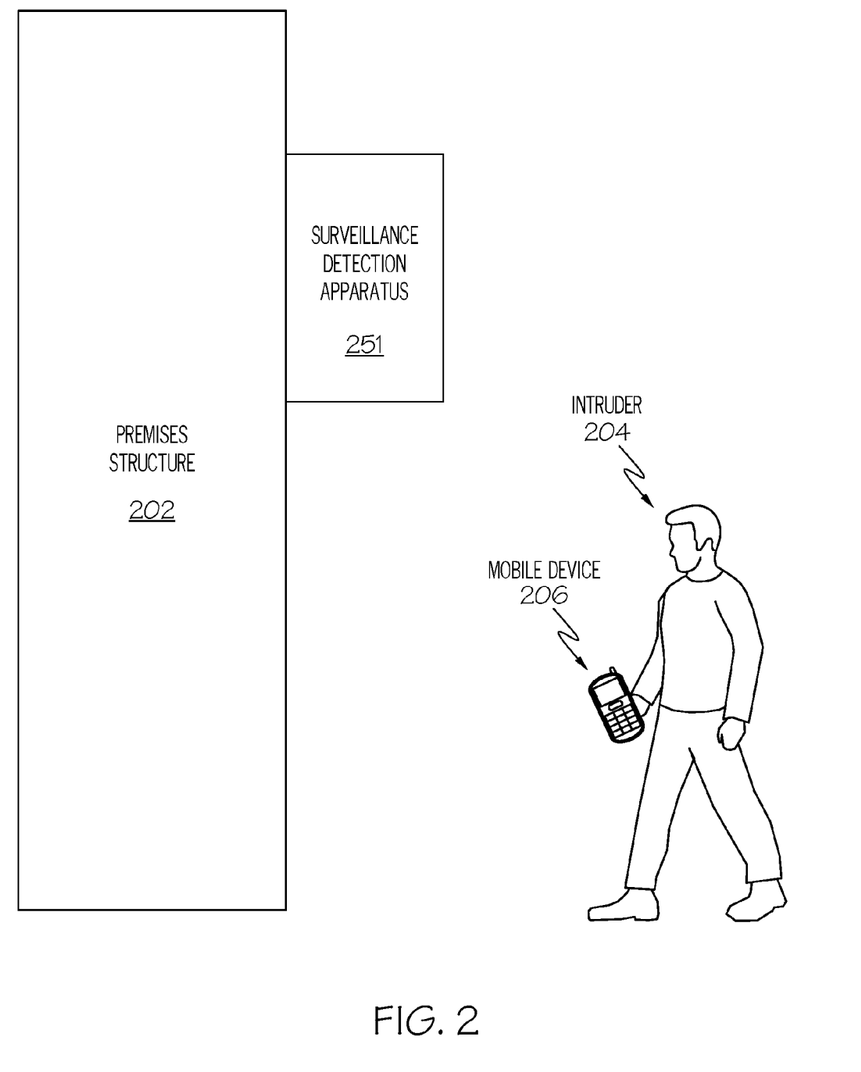
FIG. 2 illustrates a potential intruder entering a restricted area that is monitored by a surveillance detection apparatus in accordance with one or more embodiments of the present invention.

With regard now to FIG. 2, there is illustrated a potential intruder entering a restricted area that is monitored by a surveillance detection apparatus in accordance with one or more embodiments of the present invention. Assume that a surveillance detection apparatus 251 is mounted against a premises structure 202 (e.g., a wall, a pole, etc.). Assume further that the premises structure 202 and/or the area around the premises structure is a restricted zone/area/space. For example, this restricted space may be restricted for security purposes (e.g., a building to which only certain personnel are allowed access; a school in which only students and school personnel are allowed without an escort; etc.); for safety purposes (e.g., an area within a chemical refinery in which personal protective equipment such as respirators must be worn; an area next to a cliff that poses a falling hazard; etc.); etc.

Assume now that an intruder 204 has entered this restricted space. The "intruder" may or may not be authorized to enter the restricted space, but nonetheless has entered (intruded upon) the restricted space. Thus, for the purposes of the present invention, the term "intruder" is defined as a person who has entered a restricted space, regardless of whether or not such entry is authorized or not authorized. Thus, an "authorized intruder" is one who is authorized to enter the restricted space, while an "unauthorized intruder" is one who is not authorized to enter the restricted space.

As shown in FIG. 2, intruder 204 is carrying a mobile device 206, which is depicted as a cellular phone, but may be any device (e.g., a personal digital assistant, a tablet computer, etc.) that is capable of initiating a communication session with a limited range transceiver within the surveillance detection apparatus 251.

Figure 3:
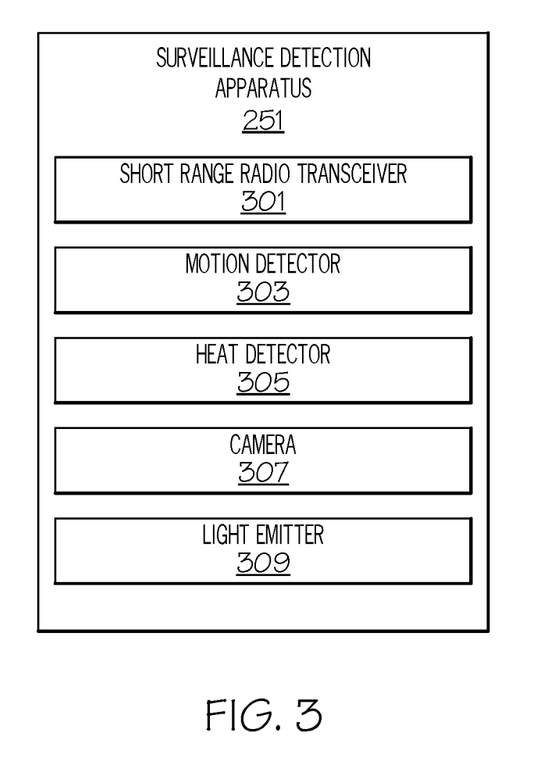
FIG. 3 depicts additional detail of the novel surveillance detection apparatus presented herein in accordance with one or more embodiments of the present invention.

With reference now to FIG. 3, additional detail of the novel surveillance detection apparatus 251 shown in FIG. 2 is presented herein in accordance with one or more embodiments of the present invention.

As shown in FIG. 3, the security detection apparatus 251 includes a short range radio transceiver 301 (analogous to short-range transceiver 123 shown in FIG. 1). This short range radio transceiver 301 may be a WiFi transceiver (e.g., part of a WiFi access point), a more limited range transceiver for monitoring smaller areas (e.g., a IEEE 802.15.x system for interrogating mobile devices that are within 10-100 meters), etc.

For purposes of explanation, assume that short range radio transceiver 301 is part of a WiFi access point. The short range radio transceiver 301 will continuously broadcast an "invitation" signal, which can be received by any WiFi device that is within range. Thus, assuming that the mobile device 206 shown in FIG. 2 is WiFi enabled, when the intruder 204 comes within range of the WiFi device (e.g., surveillance detection apparatus 251 shown in FIG. 2), the mobile device 206 will automatically initiate a "handshake" with the WiFi access point. This "handshake" includes sending the WiFi access point the identity of the mobile device 206 (e.g., the media access control—MAC address of the mobile device). A processor (e.g., processor 103 shown in FIG. 1), which is either part of a computer 101 that is monitoring the surveillance detection apparatus 251 or is part of the surveillance detection apparatus 251 itself, then retrieves a lookup table to identify the owner of the mobile device 206. The processor will assume that the owner of the mobile device 206 is the intruder 204, and will respond by either allowing the intruder 204 to enter the restricted space without a challenge (if authorized), or will issue an intrusion alert (if the intruder 204 is not authorized).

As shown in FIG. 3, the security detection apparatus 251 may be augmented with other devices to further confirm/identify the intruder 204.

For example, a motion detector 303 may augment the "handshake" from the short range radio transceiver 301 to the mobile device 206, in order to confirm that the intruder 204 is actually within the restricted space. This confirmation may also be performed by a heat detector 305 (which detects body heat from the intruder 204); and a camera 307 (i.e., a digital which captures a photographic image of the intruder 204 in order to generate a video/photographic digital file for that photographic image), either by using ambient light or by additional light created by a light emitter 309 (e.g., a light emitting diode LED array used as a "flash", floodlight, etc.).

The movement/heat/visual images captured by the motion detector 303, the heat detector 305, and/or the camera 307 can be compared to stored movement/heat/visual images signatures. That is assume that camera 307 captures an image of the face of the intruder 204. Video processing can then capture locus points on the image, compare them to known locus points on other captured images, and then identify the intruder 204 based on these comparisons.

Similarly, each intruder will also have a unique heat and motion signature. That is, each person has a certain pattern of body heat (heat signature) or walking gait (motion signature). By comparing the heat signature and/or motion signature of the intruder 204 to stored heat/motion signatures for known persons, then the identity of the intruder 204 can be confirmed (as the same or different person who owns or is assigned to use the mobile device 206).

Figure 4:
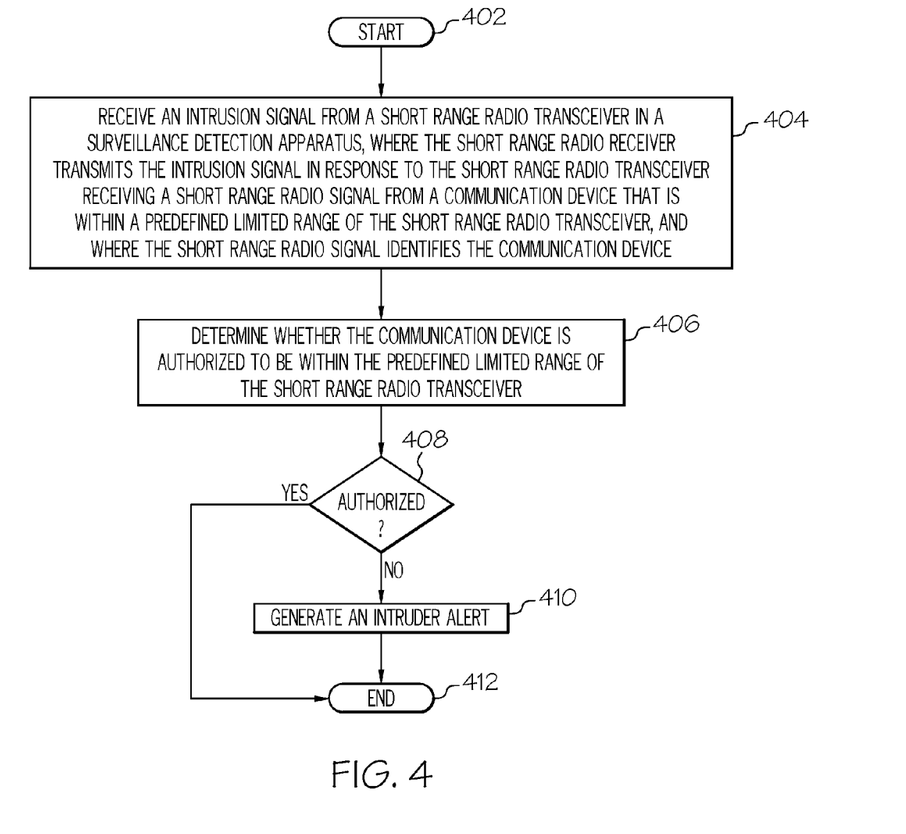
FIG. 4 is a high level flow chart of one or more steps performed by one or more embodiments of the present invention to detect and respond to an intruder in a restricted space.

With reference now to FIG. 4, a high level flow chart of one or more steps performed by one or more embodiments of the present invention to detect and respond to an intruder to a restricted space is presented.

After initiator block 402, one or more processors (e.g., within computer 101 shown in FIG. 1) receive an intrusion signal from a short range radio transceiver (e.g., short range radio transceiver 301 shown in FIG. 3) in a surveillance detection apparatus (e.g., surveillance detection apparatus 251 shown in FIG. 2, as described in block 404. As described herein, the surveillance detection apparatus sends the intrusion signal to the processor in response to the short range radio transceiver receiving a short range radio signal from a communication device that is within a predefined limited range of the short range radio transceiver (i.e., is within the restricted space that is within the predefined limited range of the short range radio transceiver). For example, if the short range radio receiver is part of a WiFi access point system, then when the WiFi access point system (and thus the short range radio transceiver) receives a MAC address from the mobile communication device (e.g., a cellular phone), then the WiFi access point system will send a signal to computer 101 identifying 1) the presence of and 2) the MAC address of the mobile communication device (e.g., cellular phone) within the restricted space.

As described in block 406, the processor(s) then determine whether the communication device is authorized to be within the predefined limited range of the short range radio transceiver. For example, the processor(s) may compare the MAC address of the cellular phone to the owner/authorized user of that cellular phone, thereby identifying the intruder 204 shown in FIG. 2. Again, note that the term "intruder" is initially defined as merely one who is entering a restricted space, and who may or may not be authorized to enter that restricted space.

As shown in query block 408, a query is made as to whether the communication device (e.g., mobile device 206 shown in FIG. 2) is authorized to enter the restricted space (thus determining whether or not intruder 204 is an "authorized intruder" or an "unauthorized intruder"). If the mobile device 206 is not authorized to be within the restricted space ("No" to query block 408), then the processor(s) generate an intruder alert (e.g., cause lights to flash, activate a klaxon, send a text message to a security service, etc.), as depicted in block 410. However, if the communication device is pre-authorized to be within the predefined limited range of the short range radio transceiver, then the intruder alert is either never generated (ending the process at terminator block 412), or else the issued intruder alert is subsequently cancelled (e.g., if it had been automatically generated based merely on the presence of a cell phone, detection of movement, detection of body heat, etc. within the restricted space).

In one or more embodiments of the present invention, the predefined limited range of the short range radio transceiver is limited to a restricted area in which unauthorized persons are not permitted to enter. That is, in one or more embodiments the short range radio transceiver 301 is tuned such that it only sends out WiFi and other interrogation signals to devices within the restricted space.

As described herein, the presence of the intruder within the predefined limited range of the short range radio transceiver can be confirmed by a motion signal from a motion detector (motion detector 303 shown in FIG. 3), a heat signal from a heat detector (e.g., heat detector 305 shown in FIG. 3); and/or a digital video image from a camera (camera 307 shown in FIG. 3).

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
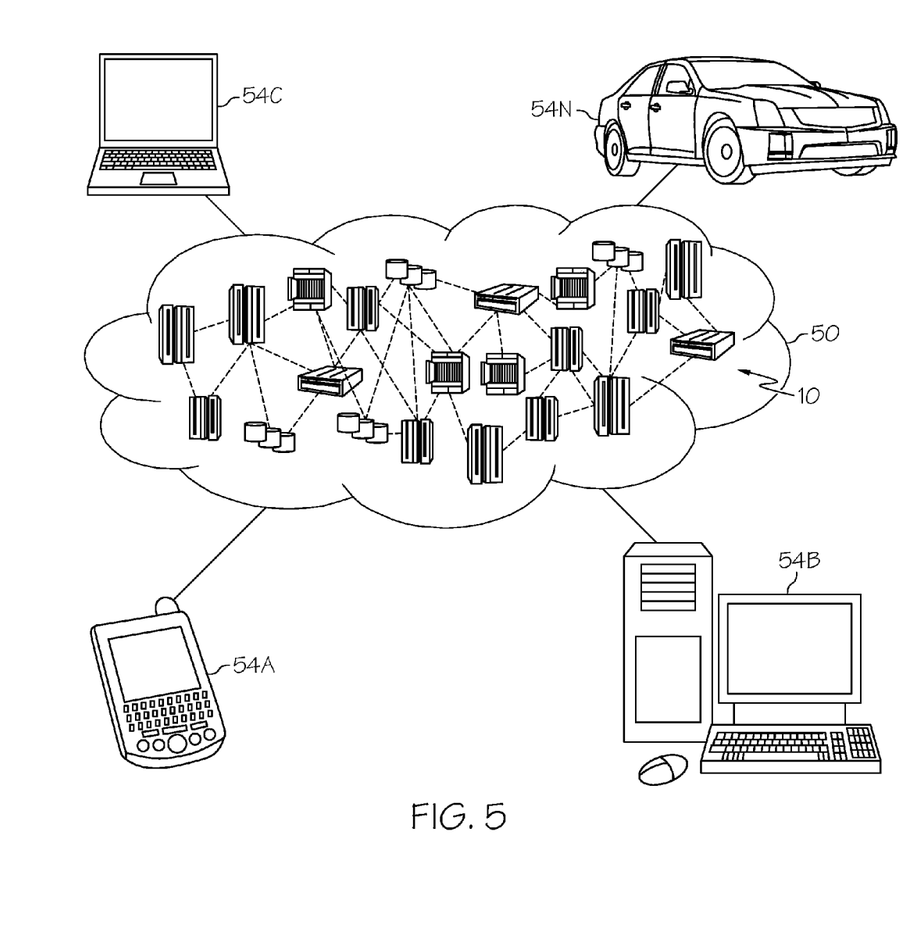
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
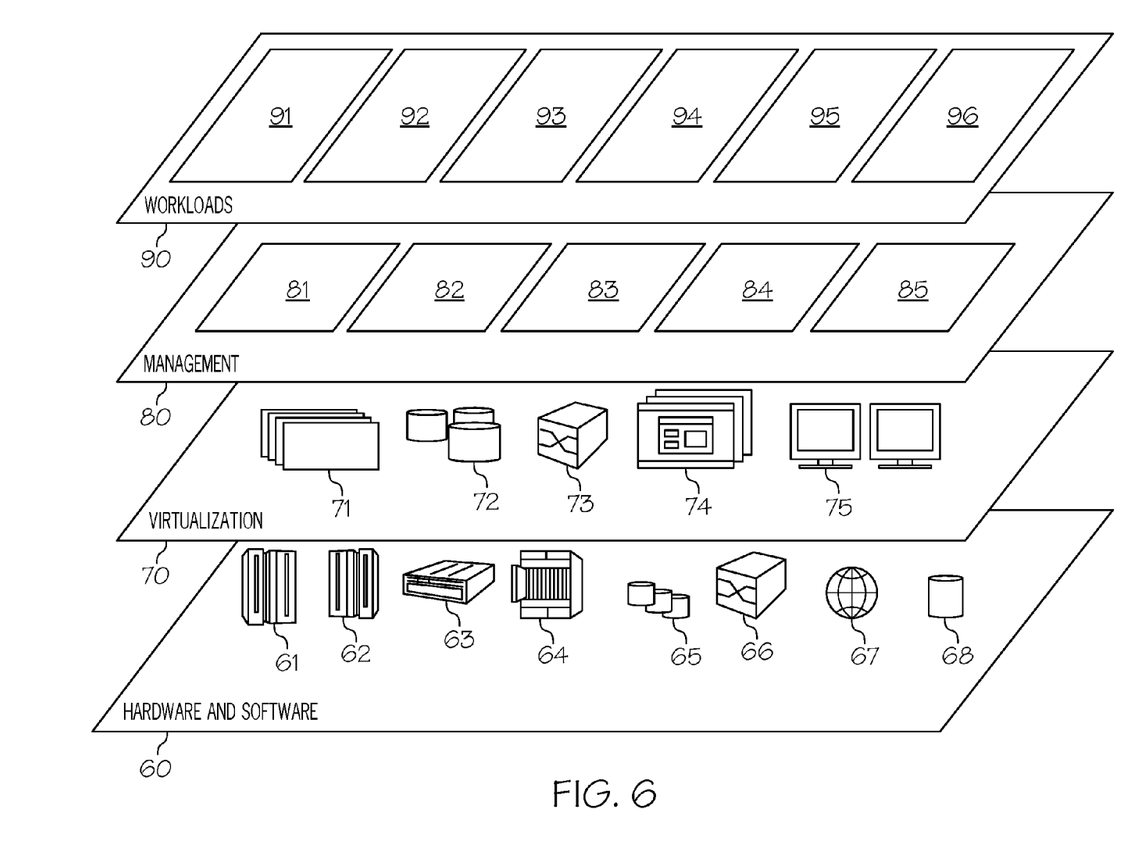
FIG. 6 depicts abstraction model layers of a cloud computing environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and surveillance detection and management processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

The present invention may be implemented through the use of a Very High Speed Integrated Circuit (VHSIC) Hardware Description Language (VHDL) program. VHDL is an exemplary design-entry language for describing an integrated circuit, such as a Field Programmable Gate Arrays (FPGA), Application Specific Integrated Circuit (ASIC), and other similar electronic devices. In other words and by way of example only, a software-implemented method according to one or more embodiments of the present invention may be emulated by a hardware-based VHDL program, which is then implemented in a VHSIC, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A surveillance detection apparatus, comprising:
   a short range radio transceiver, wherein the short range radio transceiver has a predefined limited range; and
   a processor coupled to the short range radio transceiver, wherein the surveillance detection apparatus sends an intrusion signal to the processor in response to the short range radio transceiver receiving a short range radio signal from a communication device, wherein an intruder is in possession of the communication device within range of the short range radio transceiver, wherein the communication device is not pre-authorized by the processor to be within the predefined limited range of the short range radio transceiver, wherein a presence of the communication device within the predefined limited range of the short range radio transceiver triggers an intruder alert, and wherein the processor generates the intruder alert in response to determining that the communication device is not pre-authorized to be within the predefined limited range of the short range radio transceiver.

2. The surveillance detection apparatus of claim 1, wherein the predefined limited range of the short range radio transceiver is limited to a restricted area in which unauthorized persons are not permitted to enter.

3. The surveillance detection apparatus of claim 1, further comprising:
   a motion detector, wherein the motion detector confirms a presence of the intruder within the predefined limited range of the short range radio transceiver.

4. The surveillance detection apparatus of claim 1, further comprising:
   a heat detector, wherein the heat detector confirms a presence of the intruder within the predefined limited range of the short range radio transceiver.

5. The surveillance detection apparatus of claim 1, further comprising:
   a camera, wherein the camera captures an image of the intruder while within the predefined limited range of the short range radio transceiver.

6. The surveillance detection apparatus of claim 1, wherein the processor generates no intruder alert in response to determining that the communication device is pre-authorized to be within the predefined limited range of the short range radio transceiver.

7. The surveillance detection apparatus of claim 1, wherein the short range radio transceiver is a Wi-Fi transceiver.

8. The surveillance detection apparatus of claim 1, wherein the short range radio transceiver is a near field communication (NFC) transceiver.

9. A computer-implemented method comprising:
   receiving, by one or more processors, an intrusion signal from a surveillance detection apparatus that comprises a short range radio transceiver, wherein the surveillance detection apparatus sends the intrusion signal to the one or more processors in response to the short range radio transceiver receiving a short range radio signal from a communication device that is within a predefined limited range of the short range radio transceiver, and wherein the short range radio signal identifies the communication device;
   determining, by one or more processors, whether the communication device is pre-authorized to be in a physical location that is within the predefined limited range of the short range radio transceiver; and in response to determining that the communication device is not pre-authorized to be within the predefined limited range of the short range radio transceiver, generating, by one or more processors, an intruder alert, wherein a presence of the communication device within the predefined limited range of the short range radio transceiver triggers a generation of the intruder alert.

10. The computer-implemented method of claim 9, wherein the predefined limited range of the short range radio transceiver is limited to a restricted area in which unauthorized persons are not permitted to enter.

11. The computer-implemented method of claim 9, further comprising:
   receiving, by one or more processors, a motion signal from a motion detector, wherein the motion signal is a movement signature that is specific for a particular intruder; and
   identifying, by one or more processors, an identity of the particular intruder based on the movement signature.

12. The computer-implemented method of claim 9, further comprising:
   receiving, by one or more processors, a heat signal from a heat detector, wherein the heat signal is a heat signature that is specific for a particular intruder; and
   identifying, by one or more processors, an identity of the particular intruder based on the heat signature.

13. The computer-implemented method of claim 9, further comprising:
   determining, by one or more processors, that an intruder who is in possession of the communication device is in an area that poses a hazard to the intruder; and
   in response to determining that the intruder is in the area that poses the hazard to the intruder, transmitting to the communication device, by one or more processors, a warning about the hazard to the intruder.

14. The computer-implemented method of claim 9, further comprising:
   in response to the one or more processors determining that the communication device is pre-authorized to be within the predefined limited range of the short range radio transceiver, cancelling, by one or more processors, the intruder alert.

15. The computer-implemented method of claim 9, wherein the short range radio transceiver is a Wi-Fi transceiver.

16. The computer-implemented method of claim 9, wherein the short range radio transceiver is a near field communication (NFC) transceiver.

17. A computer program product for controlling a security system, the computer program product comprising a computer readable medium having program instructions embodied therewith, wherein the computer readable storage medium is not a transitory signal per se, the program instructions readable and executable by a processor to cause the processor to perform a method comprising:
   receiving an intrusion signal from a surveillance detection apparatus that comprises a short range radio transceiver, wherein the surveillance detection apparatus sends the intrusion signal to the one or more processors in response to the short range radio transceiver receiving a short range radio signal from a communication device that is within a predefined limited range of the short range radio transceiver, and wherein the short range radio signal identifies the communication device;
   determining whether the communication device is pre-authorized to be within the predefined limited range of the short range radio transceiver; and
   in response to determining that the communication device is not pre-authorized to be within the predefined limited range of the short range radio transceiver, generating an intruder alert, wherein a presence of the communication device within the predefined limited range of the short range radio transceiver triggers a generation of the intruder alert.

18. The computer program product of claim 17, wherein the predefined limited range of the short range radio transceiver is limited to a restricted area in which unauthorized persons are not permitted to enter.

19. The computer implemented method of claim 9, further comprising:
   determining, by one or more processors, a signal strength level of a signal between the communication device and the short range radio transceiver; and
   determining, by one or more processors, that a particular intruder is at a specific location within the physical location based on the signal strength level.

20. The computer implemented method of claim 9, further comprising:
   determining, by one or more processors, visitor traffic within the physical location that is within the predefined limited range of the short range radio transceiver by identifying a quantity of communication devices that are detected by the short range radio transceiver.

* * * * *